W. P. BARCLAY.
Hydraulic and Wire-Rope Pumping System.
No. 211,125. Patented Jan. 7, 1879.

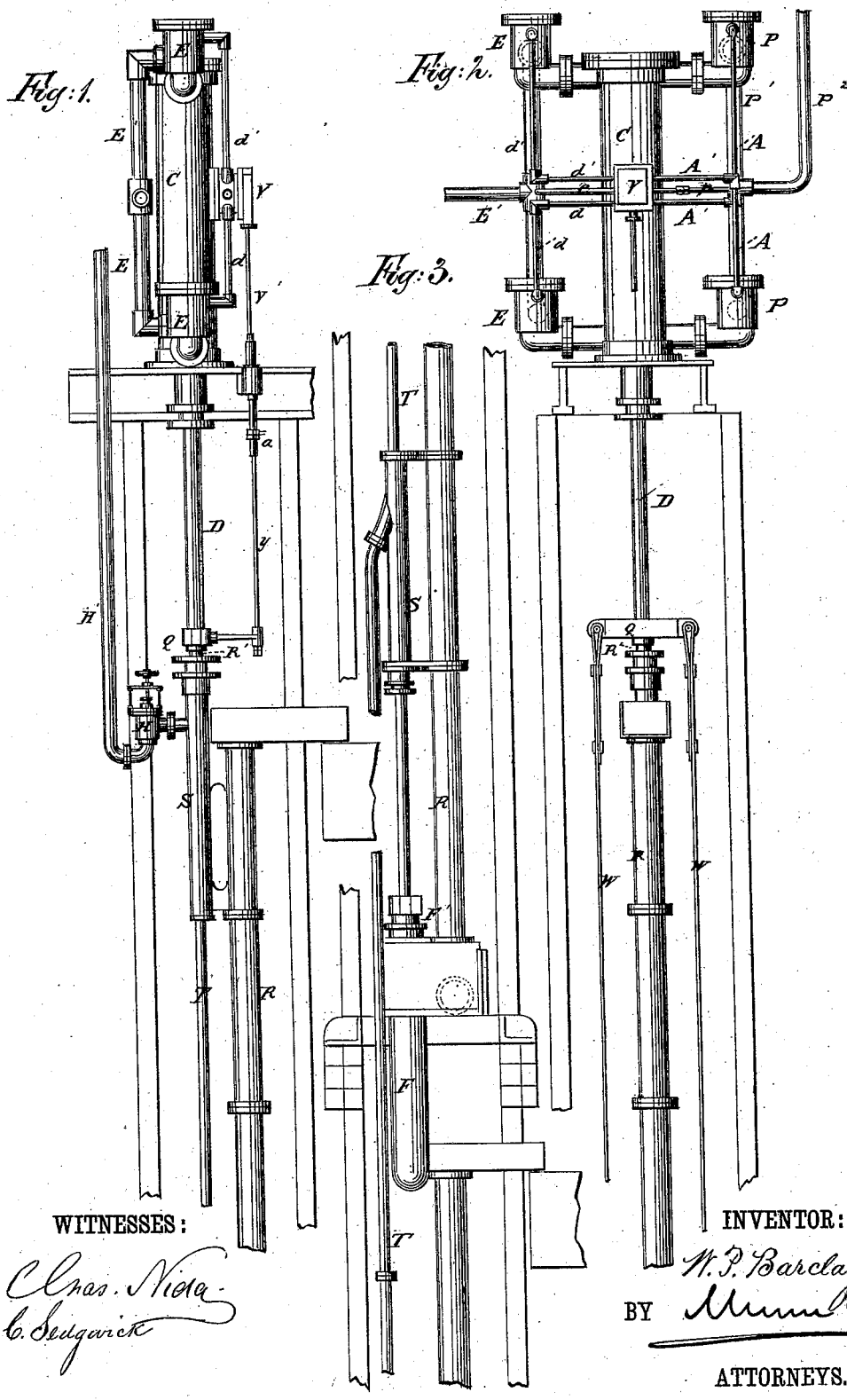

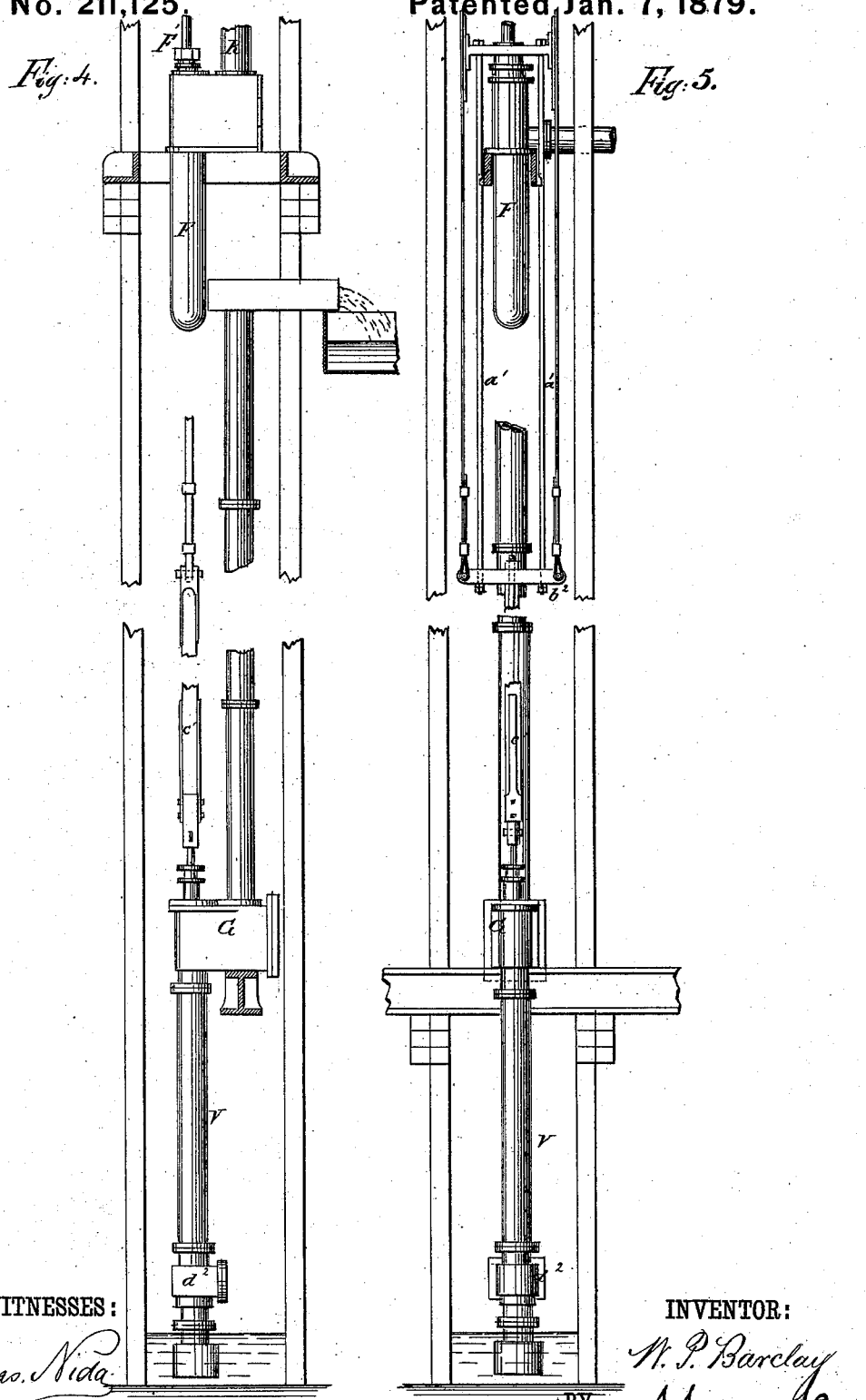

UNITED STATES PATENT OFFICE.

WILLIAM P. BARCLAY, OF VIRGINIA CITY, NEVADA.

IMPROVEMENT IN HYDRAULIC AND WIRE ROPE PUMPING SYSTEM.

Specification forming part of Letters Patent No. 211,125, dated January 7, 1879; application filed August 21, 1878.

*To all whom it may concern:*

Figure 6:
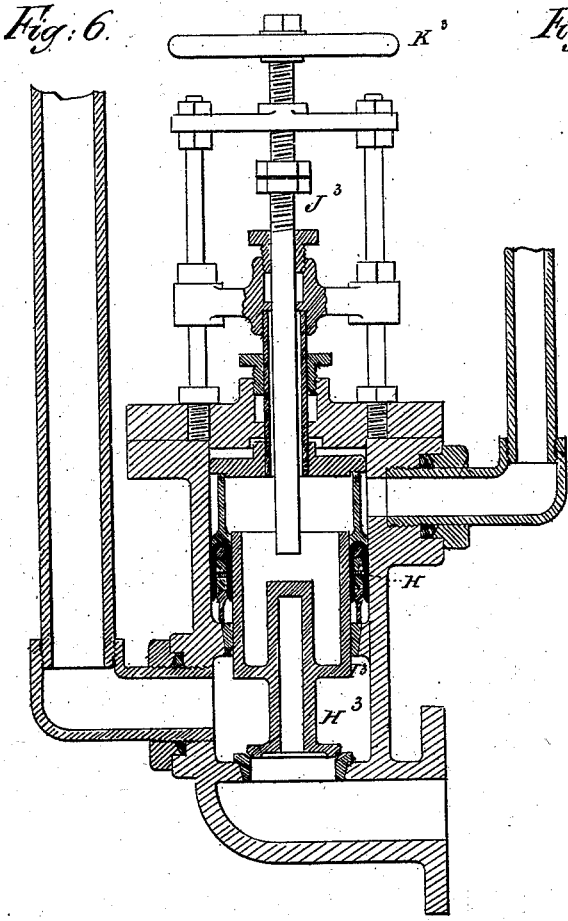
Figure 7:
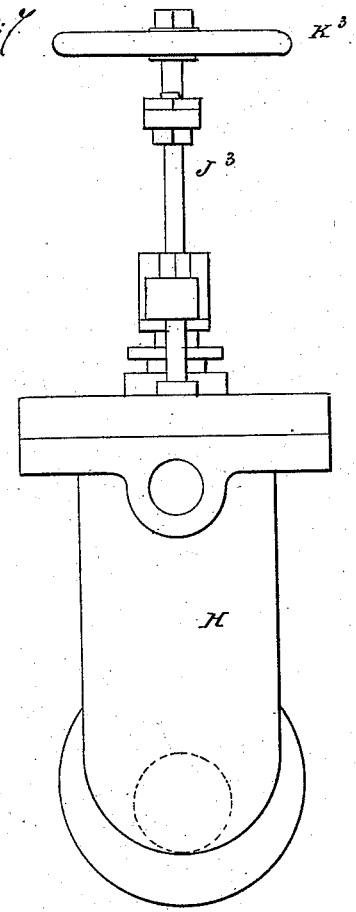
Figure 8:
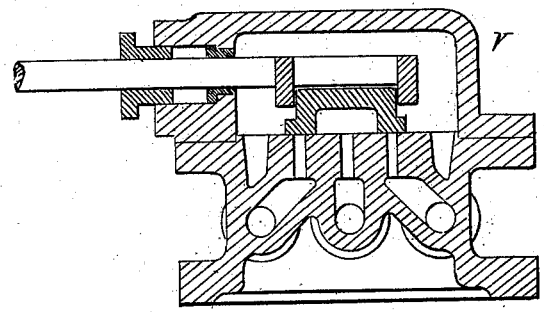
Figure 9:
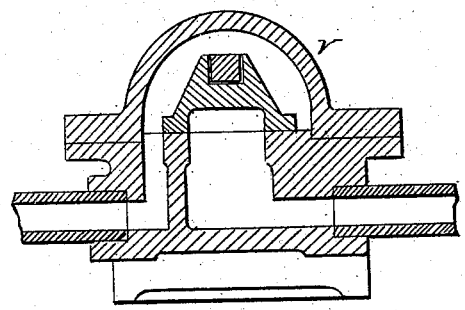

Be it known that I, WILLIAM P. BARCLAY, of Virginia City, in the county of Storey and State of Nevada, have invented a new and Improved Hydraulic and Wire Rope Pumping System, of which the following is a specification:

Figure 1 is a side elevation of my improved apparatus. Fig. 2 is a front elevation of the same. Figs. 3, 4, and 5 are detail views of the lower pumping apparatus. Fig. 6 is section of check-valve in the pressure-pipe. Fig. 7 is an enlarged side elevation of the check-valve. Fig. 8 is a vertical transverse section of the slide-valve of the hydraulic cylinder. Fig. 9 is a horizontal section of the same.

Similar letters of reference indicate corresponding parts.

The object of my invention is to provide apparatus for economically raising water from mines and deep shafts; and it consists in the arrangement of a hydraulic engine, with a series of plunger and other pumps, and a system of wire ropes and their connection, as hereinafter explained.

Referring to the drawings, $c\,c$ is a hydraulic cylinder, with inlet and outlet valves at each end. P P are the chests containing the inlet-valves, and E E are the chests containing the outlet-valves. The chests containing the inlet-valves to hydraulic cylinder are connected together by pipes $P^1\,P^1$, and the chests for the outlet-valves are connected by similar pipes $E'\,E'$. The same valve-chests are also connected to valve-chest V, which is secured to cylinder C by pipes $a, a', d$ and $d^1$. The valves in chests P P and E E are subjected to and relieved from the pressure of water from pipe $P^1$ by the action of the slide-valve working in the valve-chest V. The pipes from this valve-chest are so arranged that when the water-pressure in the valve-chest is transmitted to the top side of one inlet-valve the opposite inlet-valve is relieved of the pressure on its top side, while the reverse takes place with the outlet-valves. $p$ is the pressure-pipe leading to valve-chest V, the internal arrangement of which is clearly shown in Figs. 8 and 9. $e$ is the exhaust-pipe from the same valve-chest. $P^2$ is the pipe conveying the water that gives motion to the piston of the hydraulic cylinder. $E'$ is the exhaust-pipe from hydraulic cylinder. $V'$ is the valve-rod that is secured to tappet-rod. D is the piston-rod of hydraulic cylinder, and $R'$ the ram which works into the barrel S. A cross-head, Q, is secured to piston-rod of the hydraulic cylinder for receiving the upper ends of the wire ropes W. H is a valve-chest containing a small valve, $H^3$, opening upward. This valve is connected with a packed piston, $I^3$, and its lift is controlled by the screw $J^3$, which is provided with a hand-wheel, $K^3$, by which it may be easily regulated. $H^1$ is a pipe supplying a head of water under pressure to under side of valve in chest H, for the purpose of supplying the pipes T with water when the wire-rope connections stretch, so that the strain on the wire ropes may always be constant. T is the pressure-pipe, which contains water, and through which is transmitted the power of the engine to the pumps in the mine or shaft. R is the discharge-pipe from the pumps in mine or shaft.

When water is admitted under pressure to the hydraulic cylinder C, through the lower inlet-valve, the piston of hydraulic cylinder is forced up, causing it to lift the wire ropes W W and the plungers of force-pumps, these plungers being secured to wire ropes by cross-heads, and the spear at the upper end of plungers forces up the water that is in the pressure-pipe I I.

When the piston of the hydraulic cylinder has completed its stroke upward, it is then made to descend. The arm on cross-head Q coming in contact with the upper collar, $a$, on tappet-rod Y reverses the action of the inlet and outlet valves, and the water-pressure from pipe $P^2$ is now admitted onto top side of hydraulic piston, the under side of piston being relieved at same time, forcing the piston of hydraulic cylinder downward, and the arm $R'$ working in the barrel S. This ram forces down the water in pipe I I. The power in engine is transmitted thereby to the force and other pumps in connection therewith, causing the force-pump plungers to descend and force up the water that entered into their working-barrels on the upstroke.

F F are the working-barrels of force-pumps, and $F'$ the plungers for the same.

To the cross-head on the plunger of lower force-pump is secured a pair of tubular distance-pieces, $a'$, which go down and connect with cross-head $b''$, which joins the lower ends of wire ropes. To this lower cross-head $b''$ is fastened a spear, $c'$, to which is bolted a wood rod that works a bucket-lift or sinking pump, U. This bucket-lift pump is supplied with a discharge-valve in the chest G, and at the lower or bottom end is placed the inlet-valve $d^2$.

Having thus described my invention, I claim as new and desire to secure by Letters Patent—

1. The barrel S, containing the ram $R'$, combined with and supported from the upper end of discharge-pipe R, substantially as herein shown and described.

2. The valve-chest H on the supply-pipe $H^1$, in combination with the pump-barrels F S and pipes T T, whereby the pressure in the pipes is made self-adjustable, so that as the ropes may stretch the valve in chest opens and admits more water from the pipe connected to the under side of valve, thus keeping the strain on the wire ropes always constant, substantially as herein shown and described.

WM. P. BARCLAY.

Witnesses:
H. T. SCOTT,
GEO. FREDRICKS.